(12) United States Patent
Bryan

(10) Patent No.: US 7,387,041 B1
(45) Date of Patent: Jun. 17, 2008

(54) APPARATUS FOR FIVE-SPEED TRANSMISSION CONVERSIONS

(76) Inventor: John F Bryan, 8291 Lakeside Dr., Englewood, FL (US) 34224

( * ) Notice: Subject to any disclaimer, the term of this patent is extended or adjusted under 35 U.S.C. 154(b) by 252 days.

(21) Appl. No.: 11/206,327

(22) Filed: Aug. 18, 2005

(51) Int. Cl.
 *F16H 3/08* (2006.01)
(52) U.S. Cl. ......................................................... 74/325
(58) Field of Classification Search ....................... None
See application file for complete search history.

(56) References Cited

U.S. PATENT DOCUMENTS 4,922,599 A * 5/1990 Durfee ....................... 29/401.1

OTHER PUBLICATIONS

Medatronics Corporation. Jaguar JT5 5 Speed Installation Manual for 12 Cylinder E Type [online], Aug. 2001 [retrieved Jun. 18, 2007]. Retrieved from the Internet:<URL http://www.5speeds.com/pdfiles.html>.*
Medatronics Corporation. JT5 5 Speed Concept [online], Aug. 2001 [retrieved Jun. 18, 2007]. Retrieved from the Internet:<URL http://www.5speeds.com/concept.html>.*
Medatronics Corporation. JT5 and Shortened Tremec 3550 Comparison [online], Aug. 2001 [retrieved Jun. 18, 2007]. Retrieved from the Internet:<URL http://www.5speeds.com/tremec.html>.*
Hicks, M. Jaguar XKE Tech Tips: 5 and 6 Speed Transmission Conversions [online], 1988 [retrieved Jun. 18, 2007]. Retrieved from the Internet:<URL http://www.jag-lovers.org/e-type/5speed.html>.*
Frank, M. Jaguar E-Type Transmission Swaps [online], 2000 [retrieved Jun. 18, 2007]. Retrieved from the Internet:<URL http://www.westnet.com/~mfrank/FiveSpeeds.html>.*
Classic Jaguar. The Classic Jaguar 5 Speed (CJ5)[online], Feb. 2004 [retrieved Jun. 18, 2007]. Retrieved from the Internet:<URL http://web.archive.org/web/20040214220939/http://www.classicjaguar.com/gearbox.html>.*
FordMuscle. T5 Swaps for Early Fords [online], Dec. 2005 [retrieved Jun. 18, 2007]. Retrieved from the Internet:<URL http://www.fordmuscle.com/archives/2000/09/t5swap.index/php>.*

* cited by examiner

*Primary Examiner*—Sherry Estremsky
(74) *Attorney, Agent, or Firm*—John F. Bryan

(57) ABSTRACT

The present invention has apparatus converting a Ford Mustang five-speed transmission for installation in other, substantially different, automobiles by having a clutch housing, adapted to fit the front face of the Ford Mustang case, with gearing for four forward speeds and has an externally splined output shaft extending 5 inches beyond the rear face of the case; an output shaft housing, also housing a set of fifth-speed gears, the speedometer drive gearing and a gear shift lever gate within a dimension of approximately 3½ inches, to provide an overall length of approximately 20½", as measured from the engine mounting surface of the clutch housing to the rear face of the drive shaft connecting flange.

6 Claims, 1 Drawing Sheet

APPARATUS FOR FIVE-SPEED TRANSMISSION CONVERSIONS

TECHNICAL FIELD

The present invention relates generally to the field of automobile transmissions and more particularly, to such transmissions as are used for replacement of an original, less capable transmission.

BACKGROUND

Special interest automobiles are often sought after as distinctive transportation as well as for collection or show purposes. An owner who drives such an automobile, particularly a vintage or classic sports car, does so for pleasure, but will often find the experience to be compromised by mental comparisons to contemporary, more sophisticated vehicles. Some aspects of the experience may be cherished for their differences but, insofar as transmission performance and ease of gear-selection, the only satisfaction may be in the ability to cope with the limitations of obsolete equipment.

Modification of these autos is frowned upon by most enthusiasts, who place great value on originality. Engine "swapping", or converting to a different type engine, is particularly distasteful to the purist and will usually devalue the automobile severely. Transmission conversions are not viewed as negatively, perhaps because the transmission is buried beneath the automobile so that the change is not as obvious as an engine conversion. In fact, this change is not at all objectionable if it does not entail any alterations to the car itself. Thus, if it is readily possible to return an automobile to its original state, or give the original transmission, with an unaltered vehicle to a new owner, so as to convey the sanctity of "original parts", a transmission conversion is seen as a case of "no harm, no foul". Theoretically, the less drastic the required alterations, the more acceptable will be the conversion, but purists are indeed purists and tend to be quite arbitrary in matters of "originality". This is the downfall of most otherwise desirable transmission conversions. If the replacement transmission has the virtue of being more robust, it is probably more bulky, so that the transmission cover, floor and/or frame of the car require alteration to provide the needed clearance. If the replacement transmission provides additional speed ranges, such as a modern five-speed, for installation in place of one with three or four speeds, it is almost certain to be significantly longer. This will dictate that the drive shaft be shortened and/or a cross-member be altered. Other problems arise in the form of incompatible transmission mounting styles, necessitating frame alterations, or a different gear-shift lever location, requiring that the transmission cover be altered, either of which makes the change obvious. Other problems, such as an incompatible speedometer drive make such a conversion less desirable. As a typical example, XKE JAGUAR automobiles, made from 1961 through 1974, are highly prized by enthusiasts and collectors. Many of these cars are still in use, particularly on special occasions such as club events. The XKE transmissions are four-speed units originally designed in the 1930's and somewhat improved, but not capable of the smooth, nearly effortless gear changes of state-of-the-art designs. Moreover, the standard JAGUAR ratios require engine speeds of around 3,500 revolutions per minute or so at common road speeds of 70-75 mph. A five-speed transmission is almost certain to be significantly longer, from front flange to output coupling, than the original four-speed transmission to be replaced. The TREMEC five-speed transmission, originally designed for the FORD MUSTANG, has a case that is 9¼" in length and a tailshaft housing that is 15" long, so that the transmission length is 24½". The TREMEC transmission houses the first through fourth-speed gears in the case, while the fifth-speed gears are contained in the tailshaft housing. The four-speed JAGUAR transmission case is 10¼" long and the tailshaft housing adds another 3", for a transmission length of 13¼".

Such conversions are done as custom installations by garages or shops that cater to special interest automobiles. Thus, transmission conversions are often produced as an individual effort, or in very low volume, by technicians of ordinary skill in the mechanical arts. No more than ordinary skill is required to make a shorter tail shaft and tail shaft housing, so as to reduce the TREMEC transmission length to 16¼" but, any greater reduction threatens transmission operability. To further compound the problem, the usual manner of adapting the bolt pattern of a "transplanted" transmission to an original clutch housing is by means of a ⅝" or ¾" thick adapter plate, having both the original and new bolt patterns. This further adds to the driveline length of the conversion. When this is considered, it is seen that a typical effective overall assembly length is actually closer to 17 inches. Thus, the available XKE five-speed conversions require many of the aforesaid alterations and do not replace the original transmission, except with vehicle alterations.

A first object of the present invention is therefore, to provide a competent, five-speed transmission conversion for XKE JAGUARS and other special interest automobiles. A second object is to provide this conversion in a form that does not compromise the originality of the subject vehicle. Yet a third object of the inventions is to provide this conversion in a form that will interchange with the original transmission, for purposes of ease of installation and economy.

SUMMARY OF THE INVENTION

The present invention contemplates improved apparatus for use in the installation of five-speed transmission conversions in JAGUARS and other special interest automobiles. These inventions relate to or employ some steps and apparatus well known in the automotive arts and therefore, not the subject of detailed discussion herein.

The present inventions address the aforesaid objectives in a preferred embodiment of a five-speed transmission conversion for XKE JAGUARS, employing methods applicable to such conversions for many special interest automobiles.

For example, the TREMEC T-5 five-speed transmission as used in the FORD MUSTANG, has a transmission length of 24½". When this is added to the 7¼" length of the JAGUAR clutch housing, the overall assembly length becomes 31¾". This transmission has the first through fourth-speed gears in the main gear case and the fifth-speed gears contained in the 15¼" tailshaft housing. The four-speed JAGUAR gear case is 10¼" long and the tailshaft housing adds another 3", for a total assembly length, including the 7¼" deep clutch housing, of 20½". This is the requisite length of an ideal conversion "package".

The TREMEC T-5 transmission, gear case has an overall length of 9¼' between its front and rear faces, an input shaft and gearing for four discrete speed ratios. Gearing for the fifth speed ratio is contained in an extended output shaft housing. Apparatus for the conversion of the five-speed TREMEC T-5 transmission for installation in a substantially different automobile, such as an XKE JAGUAR, comprises a clutch housing adapted to fit the front face of the TREMEC T-5 gear case and the rear face of the recipient engine block. The preferred clutch housing has a front to rear depth of approximately 6¾", that is to say, ½" less than the JAGUAR part. The preferred output shaft has external splines and extends no more than 5 inches beyond the rear face of the T-5 case, through a much shorter output shaft housing, mounted to the case and having a length-through-bore dimension of approximately 3½". Within this length, the output shaft housing contains its rear seal, a set of driving and driven fifth speed gears, speedometer drive gearing and the gear shift lever gate. A flanged driveshaft coupling extends into the output shaft housing to engage the rear seal and rearwardly to place its flanged end approximately 4½ inches beyond the rear face of the T-5 case.

The preferred embodiment of the present invention further comprises a gear shift lever pivoting about an axis located on the output shaft housing, approximately 4 inches behind the rear surface of the T-5 gear case. A gear shift lever gate, internal to the output shaft housing, guides the shift lever for gear engagement and is adapted to clear the other internal components.

In its original form, the driven fifth gear, the speedometer drive gears, the gear shift lever gate and the rear seal are spaced apart, along the length of the output shaft. The gear shift lever gate itself is 2¼" long, the length-through-bore of the driven fifth gear is 1½", the speedometer driver is another ⅜" and the flanged output connector has 2" of spline engagement. The present invention, in addition to the shorter, specially designed clutch housing and flanged output coupling, teaches how to overlap the fifth gear, speedometer drive and rear seal with the gear shift lever gate, providing the necessary internal clearance as well as a thrust bearing for the speedometer output drive and permitting an overall assembly length of 20½" as required for Jaguar JAGUAR and other similarly compact transmission conversions.

BRIEF DESCRIPTION OF THE DRAWINGS

The accompanying drawings are incorporated into the specification to assist in explaining the present invention. The drawings illustrate preferred and alternative examples of how the invention can be made and used and are not to be construed as limiting the invention to only those examples illustrated and described. The various advantages and features of the present invention will be apparent from a consideration of the drawings in which.

DETAILED DESCRIPTION OF THE DRAWINGS

Figure 1:
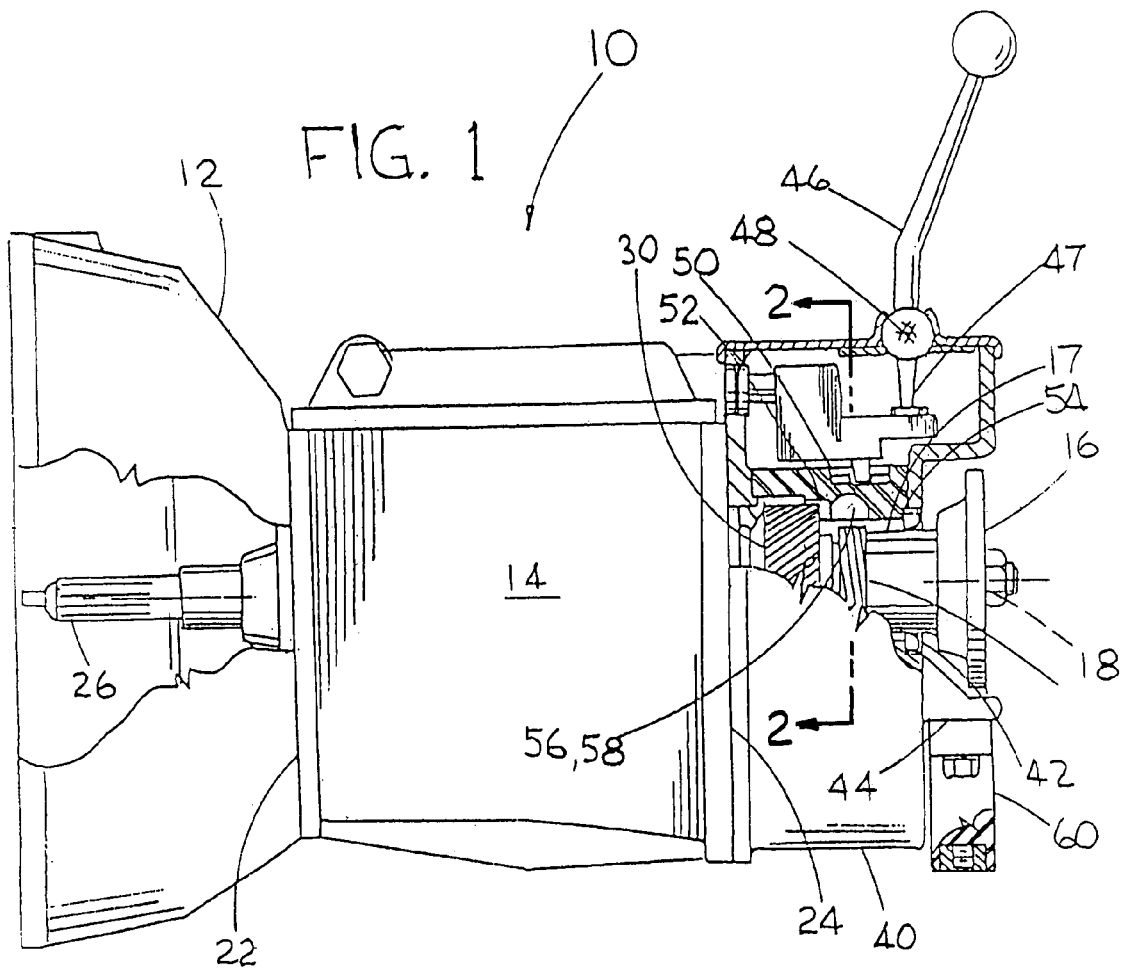
FIG. 1 is a section view of a preferred embodiment of the transmission conversion of the present inventions.

The present invention is described in the following by referring to drawings of examples of how the invention can be made and used. In these drawings, reference characters are used throughout the views to indicate corresponding parts. The embodiment shown and described herein is exemplary. Many details are well known in the art, and as such may be neither shown nor described. This invention teaches a way of adapting a modern five-speed transmission for replacement of an original four-speed transmission/clutch housing assembly having a shorter overall length, so as to preserve vehicle originality. Reducing the overall length of a modern five-speed transmission, with a torque capacity of 300 lb. ft., such as the TREMEC T-5, to about 23" by making a shorter tail shaft and tail shaft housing is no great challenge but the possibility of greater reduction is not obvious. However, it is clear that the conventional use of a ¾" adapter plate must be avoided.

Referring to FIG. 1, wherein a preferred embodiment 10 of the present inventions shows newly designed clutch housing 12, adapting the TREMEC T-5 transmission case 14 to the unshown original engine. With careful attention to moving the clutch release pivot axis and minimizing internal clearances, the depth of the clutch housing 12 is reduced to approximately 6¾". Internally splined, flanged coupling 16 is also redesigned, with the same length of spline engagement as the original equipment part and featuring a shallow retaining nut cavity 18, deep enough for a half-height nut to fit within it and a similar cavity in a mating driveshaft flange. In this manner, the coupling length is reduced by an additional ½" and the and overall length of embodiment 10 by 1".

However, this length is still 1½" greater than the desired 20½", and there are no other simple changes that permit further shortening of the length of embodiment 10 by this much.

The present invention also teaches how to reduce this length by overlapping internal transmission components and functions:

Mounting the front face 22 of T-5 transmission case 14 to clutch housing 12 places its rear face 24 in a plane 16" behind the mounting plane of clutch housing 12. Transmission case 14 includes input shaft 26 and unshown internal gearing for four discrete forward speed ratios as well as externally splined output shaft 28, extending 5" beyond rear face 24. Output shaft housing 40 is mounted to rear face 24 and has a length-through-bore dimension of approximately 3½". In its original form, as used in the FORD MUSTANG, the driven fifth gear, the speedometer drive gears, the gear shift lever gate and the rear seal are spaced apart, along the length of the output shaft. In embodiment 10 however, within the 3½" length of output shaft housing 40, the 2.323" diameter driven gear 30 for a fifth speed ratio of 0.73:1 is mounted on the splines of output shaft 28 immediately adjacent input gear 34 for the speedometer drive and the cylindrical sealing surface 17 of flanged driveshaft coupling 16, with, 2.375" diameter rear seal 42. An even larger, 2.448" diameter, fifth speed driven gear, for an overall ratio of 0.80:1, or the (smaller) TREMEC standard 0.63:1 ratio driven gear may also be installed. Output shaft housing 40 also encloses fifth speed drive gear 32 and speedometer drive output gear 36. Flanged driveshaft coupling 16 extends into output shaft housing 40 to engage rear seal 42 and rearwardly to place its flanged end approximately 4½ inches beyond the rear face 24 of the T-5 case.

The XKE, shift lever pivots on an axis approximately 19½" behind the mounting plane of the clutch housing and tilts to the rear at an angle of 18 degrees. Thus, preferred embodiment 10 has gear shift lever 46, mounted for pivotal movement about axis 48, located on output shaft housing 40, approximately 3½" behind rear face 24. The lower end 47 of shift lever 46 engages guiding grooves in gear shift lever gate 50. Gear shift lever gate 50 is a 2¼" diameter, hardened steel insert, pressed into the light alloy body of output housing 40 and positioned only 1.144" above the centerline of splined output shaft 28, a location determined by the design of T-5 transmission case 14. At this position, gear shift lever gate 50 intrudes into the spaces occupied by fifth gear 30 and rear seal 42. Speedometer drive output gear 36 engages input gear 34 tangentially, at a 10:00 o'clock point, on an angle of thirty degrees and perpendicular to the axis of output shaft 28, in order to replicate the JAGUAR speedometer take-off location at the left side of the transmission. As a result, ratio selection gate 50 also intrudes into the space occupied by the end of input gear 34. This placement of gear shift lever gate 50 would seem to dictate displacement of 2.323" diameter fifth gear 30, speedometer gears 34 & 36 and 2.375" diameter rear seal 42 along a lengthened output shaft 28, so that output shaft housing 40 would necessarily be more than 3½" long.

Figure 2:
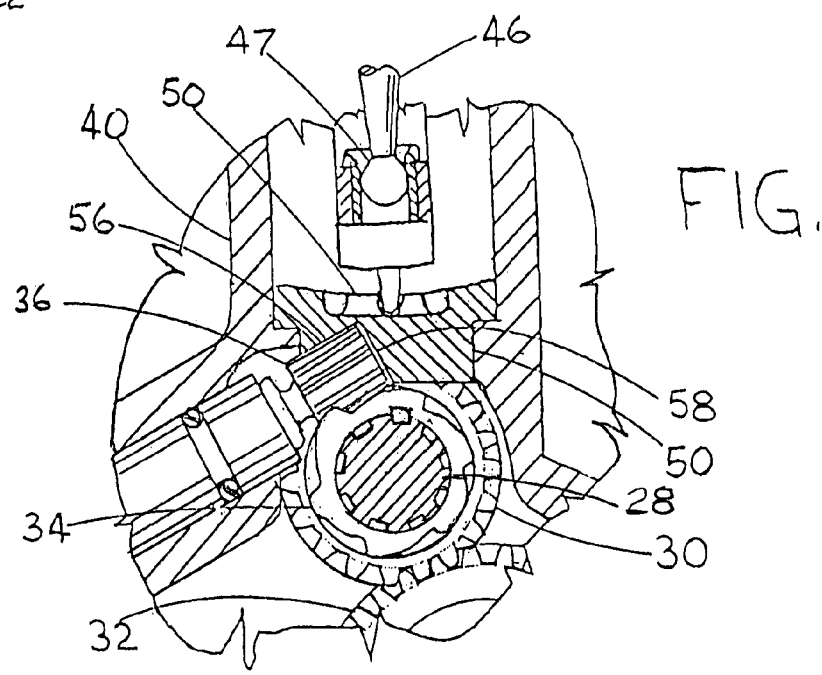
FIG. 2 is an enlarged cross-section view of the embodiment of FIG. 1 as seen along plane 2-2 of FIG. 1.

To accommodate this interference, gear shift lever gate 50 is redesigned as an investment casting, including appropriately dimensioned relief cutouts 52 and 54, to afford radial clearance for fifth gear 30 and rear seal 42. As seen in FIG. 2, relief 56 is angled at thirty degrees, with end surface 58 acting as a thrust bearing for speedometer drive output gear 36.

Resilient mount 60, connected to the under surface of flange 44 of output housing 40, conforms to the XKE JAGUAR mounting with a bolted connection.

The invention claimed is:

1. Apparatus for the conversion of a five-speed TREMEC T-5, FORD MUSTANG transmission, having an overall assembled length approaching 32" including a clutch housing and the 9¼" long TREMEC gear case, so as to reduce the overall assembled length length to 20½" including the clutch housing, for installation in a substantially different automobile, comprising:
   a clutch housing having a front to rear depth of approximately 6¾ inches and adapted to fit between the front face of the TREMEC T-5 case and the rear face of an engine block;
   an externally splined transmission output shaft, fitted within the transmission case end extending no more than 5 inches beyond the rear face thereof;
   a transmission output shaft housing having a length-through-bore dimension of approximately 3½ inches, as measured from its mounting surface to its outer rear surface;
   a set of driving and driven fifth speed gears, selected from sets providing an overall ratio of between 0.63 and 0.80: 1, mounted within the output shaft housing, with the driven fifth gear mounted on the output shaft; and
   an internally splined drive shaft connecting flange mounted on the output shaft external spline and retained so that the rear surface of the connecting flange extends approximately 1 inch beyond the rear surface of the output shaft housing, so that the overall assembly length is no more than 20½".

2. The apparatus of claim 1 and further comprising:
   a gear shift lever having a lower, guided end, with a pivot axis connected to the output shaft housing approximately 3½ inches behind the rear surface of the transmission case; and
   a gear shift lever gate mounted in the output shaft housing, beneath the pivot axis and above the output shaft, so as to engage the shift lever guided end.

3. The apparatus of claim 1 and further comprising:
   a speedometer driving gear located on the output shaft, adjacent the driven fifth gear;
   a speedometer driven gear engaging the speedometer driving gear on an axis perpendicular to the output shaft axis, so as to place it on the left side of the transmission;
   a gear shift lever gate located above the speedometer driven gear and the output shaft.

4. The apparatus of claim 2 wherein the fifth-speed driven gear location is beneath the shift lever gate and the gate includes a sufficient clearance relief therefor.

5. The apparatus of claim 3 wherein the speedometer driven gear is located between the gear shift lever gate and the output shaft and the shift lever gate includes a sufficient clearance relief and thrust bearing for that gear.

6. The apparatus of claim 1 and further comprising a resilient transmission mounting pad affixed to the an under surface of output shaft housing behind the rear surface of the transmission case.

\* \* \* \* \*

UNITED STATES PATENT AND TRADEMARK OFFICE
CERTIFICATE OF CORRECTION

| | | |
|---|---|---|
| PATENT NO. | : 7,387,041 B1 | Page 1 of 5 |
| APPLICATION NO. | : 11/206327 | |
| DATED | : June 17, 2008 | |
| INVENTOR(S) | : Bryan | |

It is certified that error appears in the above-identified patent and that said Letters Patent is hereby corrected as shown below:

The title page, showing an illustrative figure, should be deleted and substitute therefor the attached title page.

Delete column 1 line 1 through column 6 line 33 and insert column 1 line 1 through column 6 lines 38 as attached.

Signed and Sealed this
Twenty-ninth Day of March, 2011

David J. Kappos
*Director of the United States Patent and Trademark Office*

(12) United States Patent
Bryan

(10) Patent No.: US 7,387,041 B1
(45) Date of Patent: Jun. 17, 2008

(54) APPARATUS FOR FIVE-SPEED TRANSMISSION CONVERSIONS

(76) Inventor: John F Bryan, 8291 Lakeside Dr., Englewood, FL (US) 34224
Aidan Mooney, Classic Jaguar, 9916 Highway 290 West, Austin TX (US) 78736

( * ) Notice: Subject to any disclaimer, the term of this patent is extended or adjusted under 35 U.S.C. 154(b) by 252 days.

(21) Appl. No.: 11/206,327

(22) Filed: Aug. 18, 2005

(51) Int. Cl.
*F16H 3/08* (2006.01)
(52) U.S. Cl. ...................................................... 74/325
(58) Field of Classification Search ............... None
See application file for complete search history.

(56) References Cited

U.S. PATENT DOCUMENTS 4,922,599 A * 5/1990 Durfee .................. 29/401.1

OTHER PUBLICATIONS

Medatronics Corporation. Jaguar JT5 5 Speed Installation Manual for 12 Cylinder E Type [online], Aug. 2001 [retrieved Jun. 18, 2007]. Retrieved from the Internet:<URL http://www.5speeds.com/pdfiles.html>.*
Medatronics Corporation. JT5 5 Speed Concept [online], Aug. 2001 [retrieved Jun. 18, 2007]. Retrieved from the Internet:<URL http://www.5speeds.com/concept.html>.*
Medatronics Corporation. JT5 and Shortened Tremec 3550 Comparison [online], Aug. 2001 [retrieved Jun. 18, 2007]. Retrieved from the Internet:<URL http://www.5speeds.com/tremec.html>.*
Hicks, M. Jaguar XKE Tech Tips: 5 and 6 Speed Transmission Conversions [online], 1988 [retrieved Jun. 18, 2007]. Retrieved from the Internet:<URL http://www.jag-lovers.org/e-type/5speed.html>.*
Frank, M. Jaguar E-Type Transmission Swaps [online], 2000 [retrieved Jun. 18, 2007]. Retrieved from the Internet:<URL http://www.westnet.com/~mfrank/FiveSpeeds.html>.*
Classic Jaguar. The Classic Jaguar 5 Speed (CJ5)[online], Feb. 2004 [retrieved Jun. 18, 2007]. Retrieved from the Internet:<URL http://web.archive.org/web/20040214220939/http://www.classicjaguar.com/gearbox.html>.*
FordMuscle. T5 Swaps for Early Fords [online], Dec. 2005 [retrieved Jun. 18, 2007]. Retrieved from the Internet:<URL http://www.fordmuscle.com/archives/2000/09/t5swap.index/php>.*

* cited by examiner

*Primary Examiner*—Sherry Estremsky
(74) *Attorney, Agent, or Firm*—John F. Bryan

(57) ABSTRACT

The present invention has apparatus converting a Ford Mustang five-speed transmission for installation in other, substantially different, automobiles by having a clutch housing, adapted to fit the front face of the Ford Mustang case, with gearing for four forward speeds and has an externally splined output shaft extending 5 inches beyond the rear face of the case; an output shaft housing, also housing a set of fifth-speed gears, the speedometer drive gearing and a gear shift lever gate within a dimension of approximately 3½ inches, to provide an overall length of approximately 20½", as measured from the engine mounting surface of the clutch housing to the rear face of the drive shaft connecting flange.

7 Claims, 1 Drawing Sheet

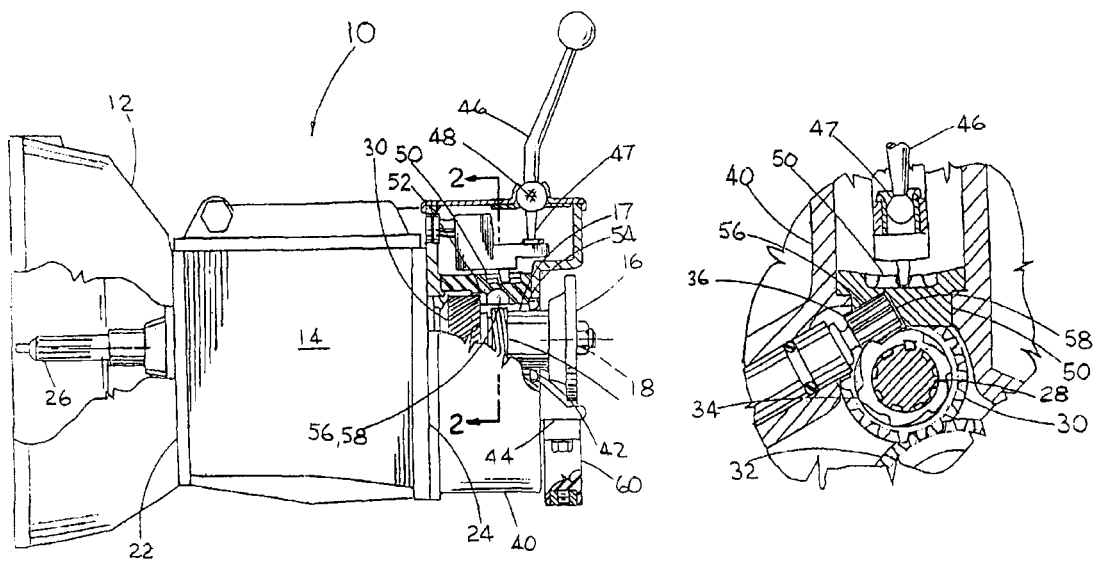

APPARATUS FOR FIVE-SPEED TRANSMISSION CONVERSIONS

TECHNICAL FIELD

The present invention relates generally to the field of automobile transmissions and more particularly, to such transmissions as are used for replacement of an original, less capable transmission.

BACKGROUND

Special interest automobiles are often sought after as distinctive transportation as well as for collection or show purposes. An owner who drives such an automobile, particularly a vintage or classic sports car, does so for pleasure, but will often find the experience to be compromised by mental comparisons to contemporary, more sophisticated vehicles. Some aspects of the experience may be cherished for their differences but, insofar as transmission performance and ease of gear-selection, the only satisfaction may be in the ability to cope with the limitations of obsolete equipment.

Modification of these autos is frowned upon by most enthusiasts, who place great value on originality. Engine "swapping", or converting to a different type engine, is particularly distasteful to the purist and will usually devalue the automobile severely. Transmission conversions are not viewed as negatively, perhaps because the transmission is buried beneath the automobile so that the change is not as obvious as an engine conversion. In fact, this change is not at all objectionable if it does not entail any alterations to the car itself. Thus, if it is readily possible to return an automobile to its original state, or give the original transmission, with an unaltered vehicle to a new owner, so as to convey the sanctity of "original parts", a transmission conversion is seen as a case of "no harm, no foul". Theoretically, the less drastic the required alterations, the more acceptable will be the conversion, but purists are indeed purists and tend to be quite arbitrary in matters of "originality". This is the downfall of most otherwise desirable transmission conversions. If the replacement transmission has the virtue of being more robust, it is probably more bulky, so that the transmission cover, floor and/or frame of the car require alteration to provide the needed clearance. If the replacement transmission provides additional speed ranges, such as a modern five-speed, for installation in place of one with three or four speeds, it is almost certain to be significantly longer. This will dictate that the drive shaft be shortened and/or a cross-member be altered. Other problems arise in the form of incompatible transmission mounting styles, necessitating frame alterations, or a different gear-shift lever location, requiring that the transmission cover be altered, either of which makes the change obvious. Other problems, such as an incompatible speedometer drive make such a conversion less desirable. As a typical example, XKE JAGUAR automobiles, made from 1961 through 1974, are highly prized by enthusiasts and collectors. Many of these cars are still in use, particularly on special occasions such as club events. The XKE transmissions are four-speed units originally designed in the 1930's and somewhat improved, but not capable of the smooth, nearly effortless gear changes of state-of-the-art designs. Moreover, the standard JAGUAR ratios require engine speeds of around 3,500 revolutions per minute or so at common road speeds of 70-75 mph. A five-speed transmission is almost certain to be significantly longer, from front flange to output coupling, than the original four-speed transmission to be replaced. The TREMEC five-speed transmission, originally designed for the FORD MUSTANG, has a case that is 9¼" in length and a tailshaft housing that is 15" long, so that the transmission length is 24½". The TREMEC transmission houses the first through fourth-speed gears in the case, while the fifth-speed gears are contained in the tailshaft housing. The four-speed JAGUAR transmission case is 10¼" long and the tailshaft housing adds another 3", for a transmission length of 13¼".

Such conversions are done as custom installations by garages or shops that cater to special interest automobiles. Thus, transmission conversions are often produced as an individual effort, or in very low volume, by technicians of ordinary skill in the mechanical arts. No more than ordinary skill is required to make a shorter tail shaft and tail shaft housing, so as to reduce the TREMEC transmission length to 16¼" but, any greater reduction threatens transmission operability. To further compound the problem, the usual manner of adapting the bolt pattern of a "transplanted" transmission to an original clutch housing is by means of a ⅝" or ¾" thick adapter plate, having both the original and new bolt patterns. This further adds to the driveline length of the conversion. When this is considered, it is seen that a typical effective overall assembly length is actually closer to 17 inches. Thus, the available XKE five-speed conversions require many of the aforesaid alterations and do not replace the original transmission, except with vehicle alterations.

A first object of the present invention is therefore, to provide a competent, five-speed transmission conversion for XKE JAGUARS and other special interest automobiles. A second object is to provide this conversion in a form that does not compromise the originality of the subject vehicle. Yet a third object of the inventions is to provide this conversion in a form that will interchange with the original transmission, for purposes of ease of installation and economy.

SUMMARY OF THE INVENTION

The present invention contemplates improved apparatus for use in the installation of five-speed transmission conversions in JAGUARS and other special interest automobiles. These inventions relate to or employ some steps and apparatus well known in the automotive arts and therefore, not the subject of detailed discussion herein.

The present inventions address the aforesaid objectives in a preferred embodiment of a five-speed transmission conversion for XKE JAGUARS, employing methods applicable to such conversions for many special interest automobiles.

For example, the TREMEC T-5 five-speed transmission as used in the FORD MUSTANG, has a transmission length of 24½". When this is added to the 7¼" length of the JAGUAR clutch housing, the overall assembly length becomes 31¾". This transmission has the first through fourth-speed gears in the main gear case and the fifth-speed gears contained in the 15¼" tailshaft housing. The four-speed JAGUAR gear case is 10¼" long and the tailshaft housing adds another 3", for a total assembly length, including the 7¼" deep clutch housing, of 20½". This is the requisite length of an ideal conversion "package".

The TREMEC T-5 transmission, gear case has an overall length of 9¼' between its front and rear faces, an input shaft and gearing for four discrete speed ratios. Gearing for the fifth speed ratio is contained in an extended output shaft housing. Apparatus for the conversion of the five-speed TREMEC T-5 transmission for installation in a substantially different automobile, such as an XKE JAGUAR, comprises a clutch housing adapted to fit the front face of the TREMEC T-5 gear case and the rear face of the recipient engine block. The preferred clutch housing has a front to rear depth of approximately 6¾", that is to say, ½" less than the JAGUAR part. The preferred output shaft has external splines and extends no more than 5 inches beyond the rear face of the T-5 case, through a much shorter output shaft housing, mounted to the case and having a length-through-bore dimension of approximately 3½". Within this length, the output shaft housing contains its rear seal, a set of driving and driven fifth speed gears, speedometer drive gearing and the gear shift lever gate. A flanged driveshaft coupling extends into the output shaft housing to engage the rear seal and rearwardly to place its flanged end approximately 4½ inches beyond the rear face of the T-5 case.

The preferred embodiment of the present invention further comprises a gear shift lever pivoting about an axis located on the output shaft housing, approximately 4 inches behind the rear surface of the T-5 gear case. A gear shift lever gate, internal to the output shaft housing, guides the shift lever for gear engagement and is adapted to clear the other internal components.

In its original form, the driven fifth gear, the speedometer drive gears, the gear shift lever gate and the rear seal are spaced apart, along the length of the output shaft. The gear shift lever gate itself is 2¼" long, the length-through-bore of the driven fifth gear is 1½", the speedometer driver is another ⅜" and the flanged output connector has 2" of spline engagement. The present invention, in addition to the shorter, specially designed clutch housing and flanged output coupling, teaches how to overlap the fifth gear, speedometer drive and rear seal with the gear shift lever gate, providing the necessary internal clearance as well as a thrust bearing for the speedometer output drive and permitting an overall assembly length of 20½" as required for Jaguar JAGUAR and other similarly compact transmission conversions.

BRIEF DESCRIPTION OF THE DRAWINGS

The accompanying drawings are incorporated into the specification to assist in explaining the present invention. The drawings illustrate preferred and alternative examples of how the invention can be made and used and are not to be construed as limiting the invention to only those examples illustrated and described. The various advantages and features of the present invention will be apparent from a consideration of the drawings in which:

FIG. 1 is a section view of a preferred embodiment of the transmission conversion of the present inventions; and FIG. 2 is an enlarged cross-section view of the embodiment of FIG. 1 as seen along plane 2-2 of FIG. 1.

DETAILED DESCRIPTION OF THE DRAWINGS

The present invention is described in the following by referring to drawings of examples of how the invention can be made and used. In these drawings, reference characters are used throughout the views to indicate corresponding parts. The embodiment shown and described herein is exemplary. Many details are well known in the art, and as such may be neither shown nor described. This invention teaches a way of adapting a modern five-speed transmission for replacement of an original four-speed transmission/clutch housing assembly having a shorter overall length, so as to preserve vehicle originality. Reducing the overall length of a modern five-speed transmission, with a torque capacity of 300 lb. ft., such as the TREMEC T-5, to about 23" by making a shorter tail shaft and tail shaft housing is no great challenge but the possibility of greater reduction is not obvious. However, it is clear that the conventional use of a ¾" adapter plate must be avoided.

Referring to FIG. 1, wherein a preferred embodiment 10 of the present inventions shows newly designed clutch housing 12, adapting the TREMEC T-5 transmission case 14 to the unshown original engine. With careful attention to moving the clutch release pivot axis and minimizing internal clearances, the depth of the clutch housing 12 is reduced to approximately 6¾". Internally splined, flanged coupling 16 is also redesigned, with the same length of spline engagement as the original equipment part and featuring a shallow retaining nut cavity 18, deep enough for a half-height nut to fit within it and a similar cavity in a mating driveshaft flange. In this manner, the coupling length is reduced by an additional ½" and the and overall length of embodiment 10 by 1".

However, this length is still 1½" greater than the desired 20½", and there are no other simple changes that permit further shortening of the length of embodiment 10 by this much.

The present invention also teaches how to reduce this length by overlapping internal transmission components and functions:

Mounting the front face 22 of T-5 transmission case 14 to clutch housing 12 places its rear face 24 in a plane 16" behind the mounting plane of clutch housing 12. Transmission case 14 includes input shaft 26 and unshown internal gearing for four discrete forward speed ratios as well as externally splined output shaft 28, extending 5" beyond rear face 24. Output shaft housing 40 is mounted to rear face 24 and has a length-through-bore dimension of approximately 3½". In its original form, as used in the FORD MUSTANG, the driven fifth gear, the speedometer drive gears, the gear shift lever gate and the rear seal are spaced apart, along the length of the output shaft. In embodiment 10 however, within the 3½" length of output shaft housing 40, the 2.323" diameter driven gear 30 for a fifth speed ratio of 0.73:1 is mounted on the splines of output shaft 28 immediately adjacent input gear 34 for the speedometer drive and the cylindrical sealing surface 17 of flanged driveshaft coupling 16, with, 2.375" diameter rear seal 42. An even larger, 2.448" diameter, fifth speed driven gear, for an overall ratio of 0.80:1, or the (smaller) TREMEC standard 0.63:1 ratio driven gear may also be installed. Output shaft housing 40 also encloses fifth speed drive gear 32 and speedometer drive output gear 36. Flanged driveshaft coupling 16 extends into output shaft housing 40 to engage rear seal 42 and rearwardly to place its flanged end approximately 4½ inches beyond the rear face 24 of the T-5 case.

The XKE, shift lever pivots on an axis approximately 19½" behind the mounting plane of the clutch housing and tilts to the rear at an angle of 18 degrees. Thus, preferred embodiment 10 has gear shift lever 46, mounted for pivotal movement about axis 48, located on output shaft housing 40, approximately 3½" behind rear face 24. The lower end 47 of shift lever 46 engages guiding grooves in gear shift lever gate 50. Gear shift lever gate 50 is a 2¼" diameter, hardened steel insert, pressed into the light alloy body of output housing 40 and positioned only 1.144" above the centerline of splined output shaft 28, a location determined by the design of T-5 transmission case 14. At this position, gear shift lever gate 50 intrudes into the spaces occupied by fifth gear 30 and rear seal 42. Speedometer drive output gear 36 engages input gear 34 tangentially, at a 10:00 o'clock point, on an angle of thirty degrees and perpendicular to the axis of output shaft 28, in order to replicate the JAGUAR speedometer take-off location at the left side of the transmission. As a result, ratio selection gate 50 also intrudes into the space occupied by the end of input gear 34. This placement of gear shift lever gate 50 would seem to dictate displacement of 2.323" diameter fifth gear 30, speedometer gears 34 & 36 and 2.375" diameter rear seal 42 along a lengthened output shaft 28, so that output shaft housing 40 would necessarily be more than 3½" long.

To accommodate this interference, gear shift lever gate 50 is redesigned as an investment casting, including appropriately dimensioned relief cutouts 52 and 54, to afford radial clearance for fifth gear 30 and rear seal 42. As seen in FIG. 2, relief 56 is angled at thirty degrees, with end surface 58 acting as a thrust bearing for speedometer drive output gear 36.

Resilient mount 60, connected to the under surface of flange 44 of output housing 40, conforms to the XKE JAGUAR mounting with a bolted connection.

The invention claimed is:

1. Apparatus for the conversion of a five-speed TREMEC T-5, FORD MUSTANG transmission, having an overall assembled length approaching 32" including a clutch housing and the 9¼" long TREMEC gear case, so as to reduce the overall assembled length length to 20½" including the clutch housing, for installation in a substantially different automobile, comprising:
   a clutch housing having a front to rear depth of approximately 6¾ inches and adapted to fit between the front face of the TREMEC T-5 case and the rear face of an engine block;
   an externally splined transmission output shaft, fitted within the transmission case end extending no more than 5 inches beyond the rear face thereof;
   a transmission output shaft housing having a length-through-bore dimension of approximately 3½ inches, as measured from its mounting surface to its outer rear surface;
   a set of driving and driven fifth speed gears, selected from sets providing an overall ratio of between 0.63 and 0.80: 1, mounted within the output shaft housing, with the driven fifth gear mounted on the output shaft; and
   an internally splined drive shaft connecting flange mounted on the output shaft external spline and retained so that the rear surface of the connecting flange extends approximately 1 inch beyond the rear surface of the output shaft housing, so that the overall assembly length is no more than 20½".

2. The apparatus of claim 1 and further comprising:
   a gear shift lever having a lower, guided end, with a pivot axis connected to the output shaft housing approximately 3½ inches behind the rear surface of the transmission case; and
   a gear shift lever gate mounted in the output shaft housing, beneath the pivot axis and above the output shaft, so as to engage the shift lever guided end.

3. The apparatus of claim 1 and further comprising:
   a speedometer driving gear located on the output shaft, adjacent the driven fifth gear;
   a speedometer driven gear engaging the speedometer driving gear on an axis perpendicular to the output shaft axis, so as to place it on the left side of the transmission; and
   a gear shift lever gate located above the speedometer driven gear and the output shaft.

4. The apparatus of claim 2 wherein the fifth-speed driven gear location is beneath the shift lever gate and the gate includes a sufficient clearance relief therefor.

5. The apparatus of claim 3 wherein the speedometer driven gear is located between the gear shift lever gate and the output shaft and the shift lever gate includes a sufficient clearance relief and thrust bearing for that gear.

6. The apparatus of claim 1 and further comprising a resilient transmission mounting pad affixed to an under surface of output shaft housing behind the rear surface of the transmission case.

7. The apparatus of claim 1 and further comprising
   a speedometer driving gear located on the output shaft, adjacent the driven fifth gear; and
   a speedometer drive output gear engaging the speedometer driving gear tangentially, at a 10:00 o'clock point, on an axis perpendicular to the axis of the output shaft and extending downwardly at the left side of the transmission.

* * * * *

UNITED STATES PATENT AND TRADEMARK OFFICE
CERTIFICATE OF CORRECTION

| | | |
|---|---|---|
| PATENT NO. | : 7,387,041 B1 | Page 1 of 5 |
| APPLICATION NO. | : 11/206327 | |
| DATED | : June 17, 2008 | |
| INVENTOR(S) | : John F. Bryan | |

It is certified that error appears in the above-identified patent and that said Letters Patent is hereby corrected as shown below:

This certificate supersedes the Certificate of Correction issued March 29, 2011. The certificate should be vacated since petition to add inventor "Aidan Mooney" was improper. The inventorship is reinstated as set forth in printed patent: --John F. Bryan, Englewood, FL (US)--. (as shown on attached title page)

Delete column 1 line 1 through column 6 line 33 and insert column 1 line 1 through column 6 lines 38 as attached.

Signed and Sealed this
Twenty-third Day of August, 2011

David J. Kappos
*Director of the United States Patent and Trademark Office*

CERTIFICATE OF CORRECTION (continued)

(12) United States Patent
Bryan

(10) Patent No.: US 7,387,041 B1
(45) Date of Patent: Jun. 17, 2008

(54) APPARATUS FOR FIVE-SPEED TRANSMISSION CONVERSIONS

(76) Inventor: John F Bryan, 8291 Lakeside Dr., Englewood, FL (US) 34224

( * ) Notice: Subject to any disclaimer, the term of this patent is extended or adjusted under 35 U.S.C. 154(b) by 252 days.

(21) Appl. No.: 11/206,327

(22) Filed: Aug. 18, 2005

(51) Int. Cl.
*F16H 3/08* (2006.01)

(52) U.S. Cl. ............................................. 74/325

(58) Field of Classification Search ................. None
See application file for complete search history.

(56) References Cited

U.S. PATENT DOCUMENTS 4,922,599 A * 5/1990 Durfee ..................... 29/401.1

OTHER PUBLICATIONS

Medatronics Corporation. Jaguar JT5 5 Speed Installation Manual for 12 Cylinder E Type [online], Aug. 2001 [retrieved Jun. 18, 2007]. Retrieved from the Internet:<URL http://www.5speeds.com/pdfiles.html>.*

Medatronics Corporation. JT5 5 Speed Concept [online], Aug. 2001 [retrieved Jun. 18, 2007]. Retrieved from the Internet:<URL http://www.5speeds.com/concept.html>.*

Medatronics Corporation. JT5 and Shortened Tremec 3550 Comparison [online], Aug. 2001 [retrieved Jun. 18, 2007]. Retrieved from the Internet:<URL http://www.5speeds.com/tremec.html>.*

Hicks, M. Jaguar XKE Tech Tips: 5 and 6 Speed Transmission Conversions [online], 1988 [retrieved Jun. 18, 2007]. Retrieved from the Internet:<URL http://www.jag-lovers.org/e-type/5speed.html>.*

Frank, M. Jaguar E-Type Transmission Swaps [online], 2000 [retrieved Jun. 18, 2007]. Retrieved from the Internet:<URL http://www.westnet.com/~mfrank/FiveSpeeds.html>.*

Classic Jaguar. The Classic Jaguar 5 Speed (CJ5)[online], Feb. 2004 [retrieved Jun. 18, 2007]. Retrieved from the Internet:<URL http://web.archive.org/web/20040214220939/http://www.classicjaguar.com/gearbox.html>.*

FordMuscle. T5 Swaps for Early Fords [online], Dec. 2005 [retrieved Jun. 18, 2007]. Retrieved from the Internet:<URL http://www.fordmuscle.com/archives/2000/09/t5swap.index/php>.*

* cited by examiner

*Primary Examiner*—Sherry Estremsky
(74) *Attorney, Agent, or Firm*—John F. Bryan

(57) ABSTRACT

The present invention has apparatus converting a Ford Mustang five-speed transmission for installation in other, substantially different, automobiles by having a clutch housing, adapted to fit the front face of the Ford Mustang case, with gearing for four forward speeds and has an externally splined output shaft extending 5 inches beyond the rear face of the case; an output shaft housing, also housing a set of fifth-speed gears, the speedometer drive gearing and a gear shift lever gate within a dimension of approximately 3½ inches, to provide an overall length of approximately 20½", as measured from the engine mounting surface of the clutch housing to the rear face of the drive shaft connecting flange.

7 Claims, 1 Drawing Sheet

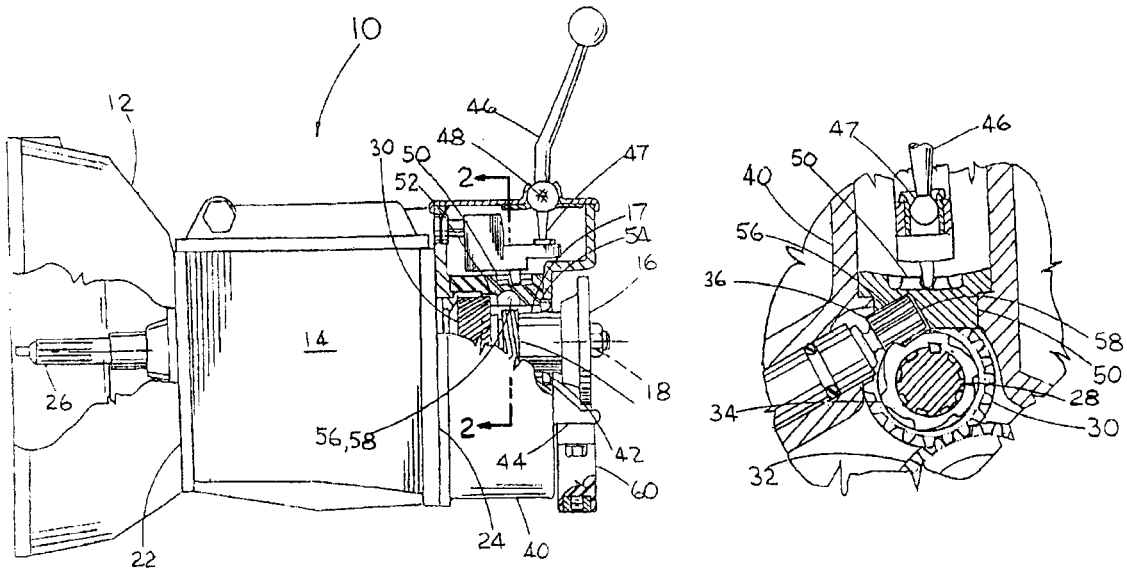

US 7,387,041 B1

APPARATUS FOR FIVE-SPEED TRANSMISSION CONVERSIONS

TECHNICAL FIELD

The present invention relates generally to the field of automobile transmissions and more particularly, to such transmissions as are used for replacement of an original, less capable transmission.

BACKGROUND

Special interest automobiles are often sought after as distinctive transportation as well as for collection or show purposes. An owner who drives such an automobile, particularly a vintage or classic sports car, does so for pleasure, but will often find the experience to be compromised by mental comparisons to contemporary, more sophisticated vehicles. Some aspects of the experience may be cherished for their differences but, insofar as transmission performance and ease of gear-selection, the only satisfaction may be in the ability to cope with the limitations of obsolete equipment.

Modification of these autos is frowned upon by most enthusiasts, who place great value on originality. Engine "swapping", or converting to a different type engine, is particularly distasteful to the purist and will usually devalue the automobile severely. Transmission conversions are not viewed as negatively, perhaps because the transmission is buried beneath the automobile so that the change is not as obvious as an engine conversion. In fact, this change is not at all objectionable if it does not entail any alterations to the car itself. Thus, if it is readily possible to return an automobile to its original state, or give the original transmission, with an unaltered vehicle to a new owner, so as to convey the sanctity of "original parts", a transmission conversion is seen as a case of "no harm, no foul". Theoretically, the less drastic the required alterations, the more acceptable will be the conversion, but purists are indeed purists and tend to be quite arbitrary in matters of "originality". This is the downfall of most otherwise desirable transmission conversions. If the replacement transmission has the virtue of being more robust, it is probably more bulky, so that the transmission cover, floor and/or frame of the car require alteration to provide the needed clearance. If the replacement transmission provides additional speed ranges, such as a modern five-speed, for installation in place of one with three or four speeds, it is almost certain to be significantly longer. This will dictate that the drive shaft be shortened and/or a cross-member be altered. Other problems arise in the form of incompatible transmission mounting styles, necessitating frame alterations, or a different gear-shift lever location, requiring that the transmission cover be altered, either of which makes the change obvious. Other problems, such as an incompatible speedometer drive make such a conversion less desirable. As a typical example, XKE JAGUAR automobiles, made from 1961 through 1974, are highly prized by enthusiasts and collectors. Many of these cars are still in use, particularly on special occasions such as club events. The XKE transmissions are four-speed units originally designed in the 1930's and somewhat improved, but not capable of the smooth, nearly effortless gear changes of state-of-the-art designs. Moreover, the standard JAGUAR ratios require engine speeds of around 3,500 revolutions per minute or so at common road speeds of 70-75 mph. A five-speed transmission is almost certain to be significantly longer, from front flange to output coupling, than the original four-speed transmission to be replaced. The TREMEC five-speed transmission, originally designed for the FORD MUSTANG, has a case that is 9¼" in length and a tailshaft housing that is 15" long, so that the transmission length is 24½". The TREMEC transmission houses the first through fourth-speed gears in the case, while the fifth-speed gears are contained in the tailshaft housing. The four-speed JAGUAR transmission case is 10¼" long and the tailshaft housing adds another 3", for a transmission length of 13¼".

Such conversions are done as custom installations by garages or shops that cater to special interest automobiles. Thus, transmission conversions are often produced as an individual effort, or in very low volume, by technicians of ordinary skill in the mechanical arts. No more than ordinary skill is required to make a shorter tail shaft and tail shaft housing, so as to reduce the TREMEC transmission length to 16¼" but, any greater reduction threatens transmission operability. To further compound the problem, the usual manner of adapting the bolt pattern of a "transplanted" transmission to an original clutch housing is by means of a ⅜" or ¼" thick adapter plate, having both the original and new bolt patterns. This further adds to the driveline length of the conversion. When this is considered, it is seen that a typical effective overall assembly length is actually closer to 17 inches. Thus, the available XKE five-speed conversions require many of the aforesaid alterations and do not replace the original transmission, except with vehicle alterations.

A first object of the present invention is therefore, to provide a competent, five-speed transmission conversion for XKE JAGUARS and other special interest automobiles. A second object is to provide this conversion in a form that does not compromise the originality of the subject vehicle. Yet a third object of the inventions is to provide this conversion in a form that will interchange with the original transmission, for purposes of ease of installation and economy.

SUMMARY OF THE INVENTION

The present invention contemplates improved apparatus for use in the installation of five-speed transmission conversions in JAGUARS and other special interest automobiles. These inventions relate to or employ some steps and apparatus well known in the automotive arts and therefore, not the subject of detailed discussion herein.

The present inventions address the aforesaid objectives in a preferred embodiment of a five-speed transmission conversion for XKE JAGUARS, employing methods applicable to such conversions for many special interest automobiles.

For example, the TREMEC T-5 five-speed transmission as used in the FORD MUSTANG, has a transmission length of 24½". When this is added to the 7¼" length of the JAGUAR clutch housing, the overall assembly length becomes 31¾". This transmission has the first through fourth-speed gears in the main gear case and the fifth-speed gears contained in the 15¼" tailshaft housing. The four-speed JAGUAR gear case is 10¼" long and the tailshaft housing adds another 3", for a total assembly length, including the 7¼" deep clutch housing, of 20½". This is the requisite length of an ideal conversion "package".

The TREMEC T-5 transmission, gear case has an overall length of 9¼' between its front and rear faces, an input shaft and gearing for four discrete speed ratios. Gearing for the fifth speed ratio is contained in an extended output shaft housing. Apparatus for the conversion of the five-speed TREMEC T-5 transmission for installation in a substantially different automobile, such as an XKE JAGUAR, comprises a clutch housing adapted to fit the front face of the TREMEC T-5 gear case and the rear face of the recipient engine block. The preferred clutch housing has a front to rear depth of approximately 6¾", that is to say, ½" less than the JAGUAR part. The preferred output shaft has external splines and extends no more than 5 inches beyond the rear face of the T-5 case, through a much shorter output shaft housing, mounted to the case and having a length-through-bore dimension of approximately 3½". Within this length, the output shaft housing contains its rear seal, a set of driving and driven fifth speed gears, speedometer drive gearing and the gear shift lever gate. A flanged driveshaft coupling extends into the output shaft housing to engage the rear seal and rearwardly to place its flanged end approximately 4½ inches beyond the rear face of the T-5 case.

The preferred embodiment of the present invention further comprises a gear shift lever pivoting about an axis located on the output shaft housing, approximately 4 inches behind the rear surface of the T-5 gear case. A gear shift lever gate, internal to the output shaft housing, guides the shift lever for gear engagement and is adapted to clear the other internal components.

In its original form, the driven fifth gear, the speedometer drive gears, the gear shift lever gate and the rear seal are spaced apart, along the length of the output shaft. The gear shift lever gate itself is 2¼" long, the length-through-bore of the driven fifth gear is 1½", the speedometer driver is another ⅜" and the flanged output connector has 2" of spline engagement. The present invention, in addition to the shorter, specially designed clutch housing and flanged output coupling, teaches how to overlap the fifth gear, speedometer drive and rear seal with the gear shift lever gate, providing the necessary internal clearance as well as a thrust bearing for the speedometer output drive and permitting an overall assembly length of 20½" as required for Jaguar JAGUAR and other similarly compact transmission conversions.

BRIEF DESCRIPTION OF THE DRAWINGS

The accompanying drawings are incorporated into the specification to assist in explaining the present invention. The drawings illustrate preferred and alternative examples of how the invention can be made and used and are not to be construed as limiting the invention to only those examples illustrated and described. The various advantages and features of the present invention will be apparent from a consideration of the drawings in which:

FIG. 1 is a section view of a preferred embodiment of the transmission conversion of the present inventions; and FIG. 2 is an enlarged cross-section view of the embodiment of FIG. 1 as seen along plane 2-2 of FIG. 1.

DETAILED DESCRIPTION OF THE DRAWINGS

The present invention is described in the following by referring to drawings of examples of how the invention can be made and used. In these drawings, reference characters are used throughout the views to indicate corresponding parts. The embodiment shown and described herein is exemplary. Many details are well known in the art, and as such may be neither shown nor described. This invention teaches a way of adapting a modern five-speed transmission for replacement of an original four-speed transmission/clutch housing assembly having a shorter overall length, so as to preserve vehicle originality. Reducing the overall length of a modern five-speed transmission, with a torque capacity of 300 lb. ft., such as the TREMEC T-5, to about 23" by making a shorter tail shaft and tail shaft housing is no great challenge but the possibility of greater reduction is not obvious. However, it is clear that the conventional use of a ¼" adapter plate must be avoided.

Referring to FIG. 1, wherein a preferred embodiment 10 of the present inventions shows newly designed clutch housing 12, adapting the TREMEC T-5 transmission case 14 to the unshown original engine. With careful attention to moving the clutch release pivot axis and minimizing internal clearances, the depth of the clutch housing 12 is reduced to approximately 6¾". Internally splined, flanged coupling 16 is also redesigned, with the same length of spline engagement as the original equipment part and featuring a shallow retaining nut cavity 18, deep enough for a half-height nut to fit within it and a similar cavity in a mating driveshaft flange. In this manner, the coupling length is reduced by an additional ½" and the and overall length of embodiment 10 by 1".

However, this length is still 1½" greater than the desired 20½", and there are no other simple changes that permit further shortening of the length of embodiment 10 by this much.

The present invention also teaches how to reduce this length by overlapping internal transmission components and functions:

Mounting the front face 22 of T-5 transmission case 14 to clutch housing 12 places its rear face 24 in a plane 16" behind the mounting plane of clutch housing 12. Transmission case 14 includes input shaft 26 and unshown internal gearing for four discrete forward speed ratios as well as externally splined output shaft 28, extending 5" beyond rear face 24. Output shaft housing 40 is mounted to rear face 24 and has a length-through-bore dimension of approximately 3½". In its original form, as used in the FORD MUSTANG, the driven fifth gear, the speedometer drive gears, the gear shift lever gate and the rear seal are spaced apart, along the length of the output shaft. In embodiment 10 however, within the 3½" length of output shaft housing 40, the 2.323" diameter driven gear 30 for a fifth speed ratio of 0.73:1 is mounted on the splines of output shaft 28 immediately adjacent input gear 34 for the speedometer drive and the cylindrical sealing surface 17 of flanged driveshaft coupling 16, with, 2.375" diameter rear seal 42. An even larger, 2.448" diameter, fifth speed driven gear, for an overall ratio of 0.80:1, or the (smaller) TREMEC standard 0.63:1 ratio driven gear may also be installed. Output shaft housing 40 also encloses fifth speed drive gear 32 and speedometer drive output gear 36. Flanged driveshaft coupling 16 extends into output shaft housing 40 to engage rear seal 42 and rearwardly to place its flanged end approximately 4½ inches beyond the rear face 24 of the T-5 case.

The XKE, shift lever pivots on an axis approximately 19½" behind the mounting plane of the clutch housing and tilts to the rear at an angle of 18 degrees. Thus, preferred embodiment 10 has gear shift lever 46, mounted for pivotal movement about axis 48, located on output shaft housing 40, approximately 3½" behind rear face 24. The lower end 47 of shift lever 46 engages guiding grooves in gear shift lever gate 50. Gear shift lever gate 50 is a 2¼" diameter, hardened steel insert, pressed into the light alloy body of output housing 40 and positioned only 1.144" above the centerline of splined output shaft 28, a location determined by the design of T-5 transmission case 14. At this position, gear shift lever gate 50 intrudes into the spaces occupied by fifth gear 30 and rear seal 42. Speedometer drive output gear 36 engages input gear 34 tangentially, at a 10:00 o'clock point, on an angle of thirty degrees and perpendicular to the axis of output shaft 28, in order to replicate the JAGUAR speedometer take-off location at the left side of the transmission. As a result, ratio selection gate 50 also intrudes into the space occupied by the end of input gear 34. This placement of gear shift lever gate 50 would seem to dictate displacement of 2.323" diameter fifth gear 30, speedometer gears 34 & 36 and 2.375" diameter rear seal 42 along a lengthened output shaft 28, so that output shaft housing 40 would necessarily be more than 3½" long.

To accommodate this interference, gear shift lever gate 50 is redesigned as an investment casting, including appropriately dimensioned relief cutouts 52 and 54, to afford radial clearance for fifth gear 30 and rear seal 42. As seen in FIG. 2, relief 56 is angled at thirty degrees, with end surface 58 acting as a thrust bearing for speedometer drive output gear 36.

Resilient mount 60, connected to the under surface of flange 44 of output housing 40, conforms to the XKE JAGUAR mounting with a bolted connection.

The invention claimed is:

1. Apparatus for the conversion of a five-speed TREMEC T-5, FORD MUSTANG transmission, having an overall assembled length approaching 32" including a clutch housing and the 9¼" long TREMEC gear case, so as to reduce the overall assembled length length to 20½" including the clutch housing, for installation in a substantially different automobile, comprising:
 a clutch housing having a front to rear depth of approximately 6¾ inches and adapted to fit between the front face of the TREMEC T-5 case and the rear face of an engine block;
 an externally splined transmission output shaft, fitted within the transmission case end extending no more than 5 inches beyond the rear face thereof;
 a transmission output shaft housing having a length-through-bore dimension of approximately 3½ inches, as measured from its mounting surface to its outer rear surface;
 a set of driving and driven fifth speed gears, selected from sets providing an overall ratio of between 0.63 and 0.80:1, mounted within the output shaft housing, with the driven fifth gear mounted on the output shaft; and
 an internally splined drive shaft connecting flange mounted on the output shaft external spline and retained so that the rear surface of the connecting flange extends approximately 1 inch beyond the rear surface of the output shaft housing, so that the overall assembly length is no more than 20½".

2. The apparatus of claim 1 and further comprising:
 a gear shift lever having a lower, guided end, with a pivot axis connected to the output shaft housing approximately 3½ inches behind the rear surface of the transmission case; and
 a gear shift lever gate mounted in the output shaft housing, beneath the pivot axis and above the output shaft, so as to engage the shift lever guided end.

3. The apparatus of claim 1 and further comprising:
 a speedometer driving gear located on the output shaft, adjacent the driven fifth gear;
 a speedometer driven gear engaging the speedometer driving gear on an axis perpendicular to the output shaft axis, so as to place it on the left side of the transmission; and
 a gear shift lever gate located above the speedometer driven gear and the output shaft.

4. The apparatus of claim 2 wherein the fifth-speed driven gear location is beneath the shift lever gate and the gate includes a sufficient clearance relief therefor.

5. The apparatus of claim 3 wherein the speedometer driven gear is located between the gear shift lever gate and the output shaft and the shift lever gate includes a sufficient clearance relief and thrust bearing for that gear.

6. The apparatus of claim 1 and further comprising a resilient transmission mounting pad affixed to an under surface of output shaft housing behind the rear surface of the transmission case.

7. The apparatus of claim 1 and further comprising
 a speedometer driving gear located on the output shaft, adjacent the driven fifth gear; and
 a speedometer drive output gear engaging the speedometer driving gear tangentially, at a 10:00 o'clock point, on an axis perpendicular to the axis of the output shaft and extending downwardly at the left side of the transmission.

* * * * *